(12) United States Patent
Yano

(10) Patent No.: US 7,253,847 B2
(45) Date of Patent: Aug. 7, 2007

(54) LIGHT ADJUSTER AND LAMINATED GLASS

(75) Inventor: Yuichi Yano, Ichihara (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 11/050,046

(22) Filed: Feb. 3, 2005

(65) Prior Publication Data

US 2005/0134750 A1    Jun. 23, 2005

Related U.S. Application Data

(63) Continuation of application No. PCT/JP03/09786, filed on Aug. 1, 2003.

(30) Foreign Application Priority Data

Aug. 6, 2002  (JP)  .............................. 2002-228743

(51) Int. Cl.
*G02F 1/135* (2006.01)
*G02F 1/1335* (2006.01)

(52) U.S. Cl. .............................. 349/24; 349/13; 349/16
(58) Field of Classification Search .................. 349/13, 349/16, 24

See application file for complete search history.

(56) References Cited

U.S. PATENT DOCUMENTS

| | | | | |
|---|---|---|---|---|
| 5,473,450 A | * | 12/1995 | Yamada et al. | 349/84 |
| 5,843,332 A | * | 12/1998 | Takeuchi et al. | 252/299.01 |
| 6,413,693 B1 | * | 7/2002 | Bekku et al. | 430/256 |
| 6,781,666 B2 | * | 8/2004 | Kobayashi et al. | 349/185 |

FOREIGN PATENT DOCUMENTS

| | | |
|---|---|---|
| JP | 1-77620 | 5/1989 |
| JP | 4-86807 A | 3/1992 |
| JP | 4-126224 | 11/1992 |

* cited by examiner

*Primary Examiner*—Mike Qi
(74) *Attorney, Agent, or Firm*—Cohen Pontani Lieberman & Pavane LLP

(57) ABSTRACT

A light adjuster which is free from occurrence of cloudiness, and can maintain sufficient workability to improve the yield. In the light adjuster, transparent electrically conductive films 102a and 102b are provided on respective surfaces of a pair of PET films 103a and 103b, a liquid crystal layer 101 is interposed between the transparent electrically conductive films 102a and 102b, and the force required for stripping the liquid crystal layer 101 from the transparent electrically conductive films 102a and 102b is in a range of 15 to 50 g/cm.

12 Claims, 2 Drawing Sheets

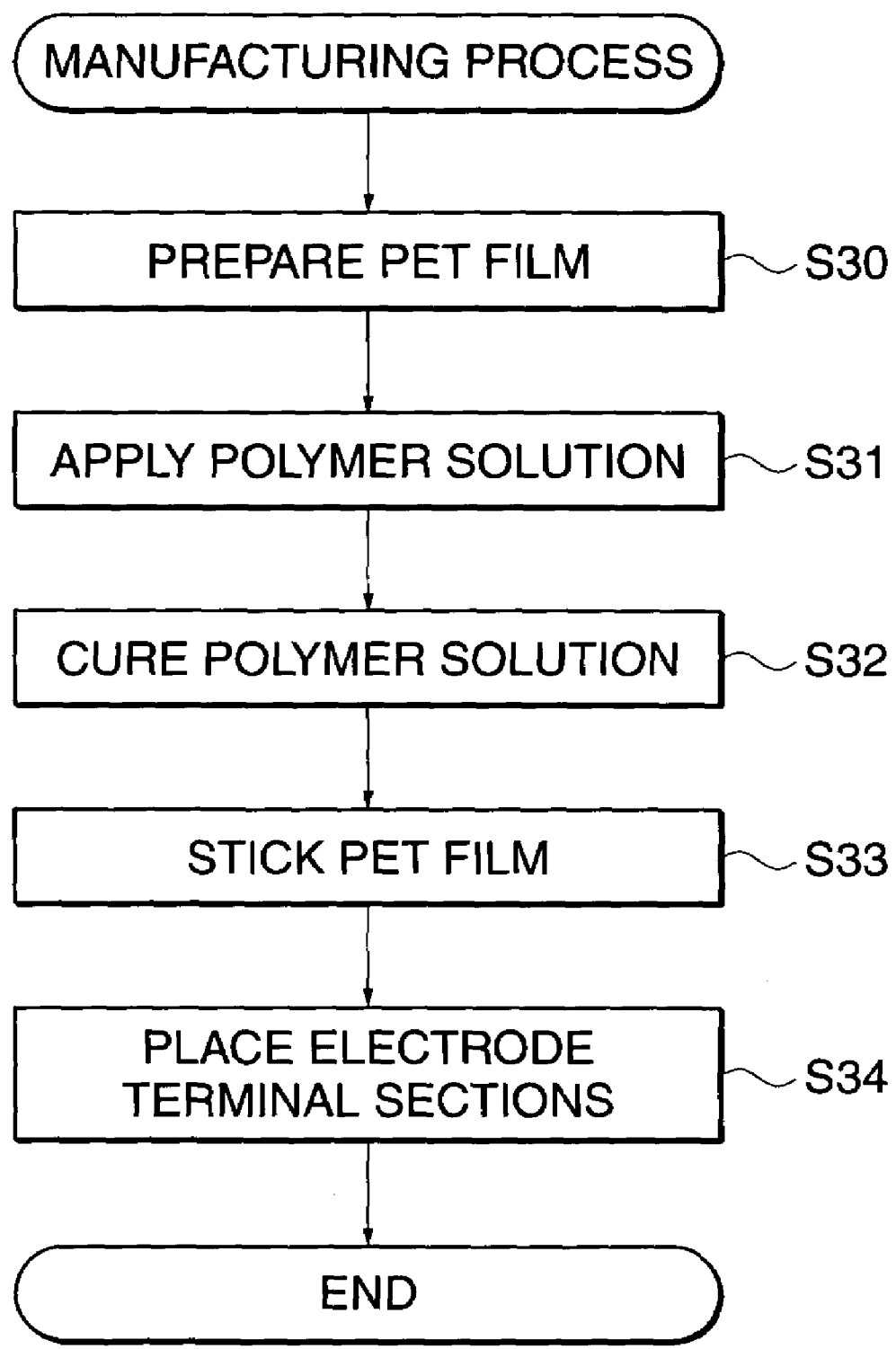

LIGHT ADJUSTER AND LAMINATED GLASS

This application is a U.S. Continuation Application under 35 USC 371 of International Application PCT/JP2003/009786 filed Aug. 1, 2003.

TECHNICAL FIELD

The present invention relates to a light adjuster and a laminated glass which can control the amount of light transmitted.

BACKGROUND ART

For example, a light adjuster which is sandwiched between a plurality of glass sheets to control the amount of light transmitted through the glass sheets is usually comprised of a liquid crystal layer, and a pair of sheets (PET films) each having a transparent electrically conductive film formed thereon, which sandwich the liquid crystal layer therebetween.

The liquid crystal layer includes liquid crystal molecules whose orientation is changed by voltage application, and is capable of controlling the amount of light transmitted according to changes in the orientation of the liquid crystal molecules caused by voltage applied to the liquid crystal layer from the pair of transparent electrically conductive films.

In manufacturing the light adjuster, first, the liquid crystal layer is formed on the transparent electrically conductive film of one of the PET films, and then the other PET film having the transparent electrically conductive film is stuck onto the liquid crystal layer thus formed such that the transparent electrically conductive film of the other PET film contacts the formed liquid crystal layer. This sequence of operations is performed in succession, and the light adjuster thus manufactured is in the form of a long sheet.

The light adjuster thus manufactured is used either alone or in the form of a laminated glass in which the light adjuster is sandwiched between a plurality of glass sheets. However, there are various sizes of windows and doors into which the light adjuster is to be fitted either alone or in the form of a laminated glass, and hence the light adjuster used alone or in the form of a laminated glass is required to be in various sizes.

On the other hand, to supply electric power to the transparent electrically conductive films of the light adjuster, the light adjuster is provided with electrode terminal sections connected to the transparent electrically conductive films and having lead wires for receiving electric power supplied from the outside. Generally, in housing the light adjuster or the laminated glass with the light adjuster sandwiched between the glass sheets, for example, terminals of an external power supply which supplies electric power to the lead wires of the electrode terminal sections are disposed inside e.g. a sash which holds the periphery of the light adjuster or the laminated glass in consideration of the appearance of the housed light adjuster or laminated glass, and hence the electrode terminal sections need to be disposed at the periphery of the light adjuster.

For this reason, it is configured such that the liquid crystal layer and transparent electrically conductive films can be peeled or stripped off at arbitrary positions thereof so that the light adjuster in the form of a long sheet can be cut out in a size corresponding to an area for use (such as a windrow or a door), then a part of the liquid crystal layer at a position where the light adjuster is to be housed is removed, and parts of the transparent electrically conductive films at this position can be provided with electrode terminal sections.

In this light adjuster, the force required for stripping the liquid crystal layer off is controlled to be as low as possible, i.e. not greater than 10 g/cm due to requirements for improvement of workability.

However, there is the following problem with the prior art: In fitting a light adjuster alone into a window or a door with the periphery of the light adjuster being supported, a force is concentrated at the periphery of the light adjuster since the periphery is supported, or in manufacturing a laminated glass with a light adjuster sandwiched between a plurality of glass sheets, a force is concentrated at the periphery of the light adjuster due to adhesion of the glass sheets and the light adjuster, and if the force for stripping the light adjuster off is set to be not greater than 10 g/cm due to the above-mentioned requirements for improvement of workability, the transparent electrically conductive films and the liquid crystal layer can exfoliate on the market due to the shortage of the stripping force, and then the portion of the light adjuster where the exfoliation occurs becomes cloudy.

On the other hand, if the force required for stripping off is set to be excessively high, the workability in stripping the liquid crystal layer off is degraded, and partial exfoliation of the transparent electrically conductive films can occur, resulting in a degraded yield.

It is therefore an object of the present invention to provide a light adjuster and a laminated glass which are free from occurrence of cloudiness, and can maintain sufficient workability to improve the yield.

DISCLOSURE OF THE INVENTION

To attain the above object, in a first aspect of the present invention, there is provided a light adjuster comprising a pair of substrates, at least one of the substrates being transparent, transparent electrically conductive films provided on respective facing surfaces of the pair of substrates, and a liquid crystal layer interposed between the transparent electrically conductive films, wherein a force required for stripping the liquid crystal layer from the transparent electrically conductive films is in a range of 15 to 50 g/cm.

Preferably, in the first aspect of the present invention, the force required for stripping is in a range of 20 to 30 g/cm.

Preferably, in the first aspect of the present invention, the liquid crystal layer is stuck onto the transparent electrically conductive films in a state where the liquid crystal layer is sticky.

To attain the above object, in a second aspect of the present invention, there is provided a laminated glass comprising at least two glass sheets disposed in facing relation to each other, and a light adjuster interposed between the two glass sheets, wherein the light adjuster comprises a pair of substrates, at least one of the substrates being transparent, transparent electrically conductive films provided on respective facing surfaces of the pair of substrates and a liquid crystal layer interposed between the transparent electrically conductive films, and wherein a force required for stripping the liquid crystal layer from the transparent electrically conductive films is in a range of 15 to 50 g/cm.

Preferably, in the second aspect of the present invention, the force required for stripping is in a range of 20 to 30 g/cm.

Preferably, in the second aspect of the present invention, the liquid crystal layer is stuck onto the transparent electrically conductive films in a state where the liquid crystal layer is sticky.

BRIEF DESCRIPTION OF THE DRAWINGS

FIG. 3 is a flow chart of a process for manufacturing the light adjusting sheet 100 appearing in FIG. 1.

BEST MODE OF CARRYING OUT THE INVENTION

The present inventor carried out assiduous studies to attain the above object, and as a result, found that in a light adjuster in which transparent electrically conductive films are provided on respective facing surfaces of a pair of substrates, at least one of the substrates being transparent, and a liquid crystal layer is interposed between the transparent electrically conductive films, if the force for stripping the liquid crystal layer from the transparent electrically conductive films is in a range of 15 to 50 g/cm, and more preferably in a range of 20 to 30 g/cm, the occurrence of cloudiness can be prevented, sufficient workability in stripping the liquid crystal layer off can be maintained, partial exfoliation of the transparent electrically conductive films can be avoided, and degradation of the yield can be prevented.

Also, the inventor found that if the transparent electrically conductive films are stuck onto the liquid crystal layer in a state in which the liquid crystal layer is sticky, the force for stripping the liquid crystal layer from the transparent electrically conductive films can be easily set to be in a predetermined range.

The present invention has been devised based on the results of the above described studies.

A description will hereunder be given of a light adjuster according to an embodiment of the present invention with reference to the drawings.

Figure 1:
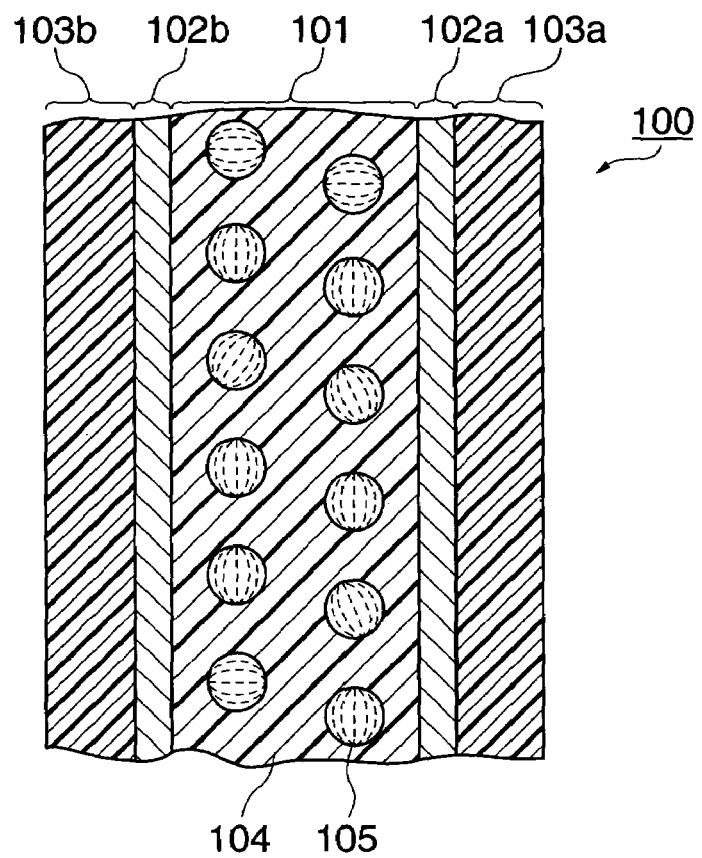
FIG. 1 is a sectional view of a light adjuster according to an embodiment of the present invention.

FIG. 1 is a sectional view of the light adjuster according to the embodiment of the present invention.

In FIG. 1, a light adjusting sheet 100 is comprised of a single liquid crystal layer 101, a pair of sheet-like transparent electrically conductive films 102a and 102b that sandwich the liquid crystal layer 101 therebetween, and a pair of PET films 103a and 103b.

The liquid crystal layer 101 is formed of a transparent polymer film 104 having a large number of voids therein, and each void is filled with nematic liquid crystal molecules having the same ordinary refractive index as the refractive index of the polymer film 104 so as to form a liquid crystal capsule 105.

The liquid crystal layer 101 and each of the sheet-like transparent electrically conductive films 102a and 102b are stuck to each other such that they can be stripped off, and the force required for stripping the liquid crystal layer 101 from the transparent electrically conductive films 102a and 102b is in a range of 15 to 50 g/cm, and more preferably in a range of 20 to 30 g/cm.

Figure 2:
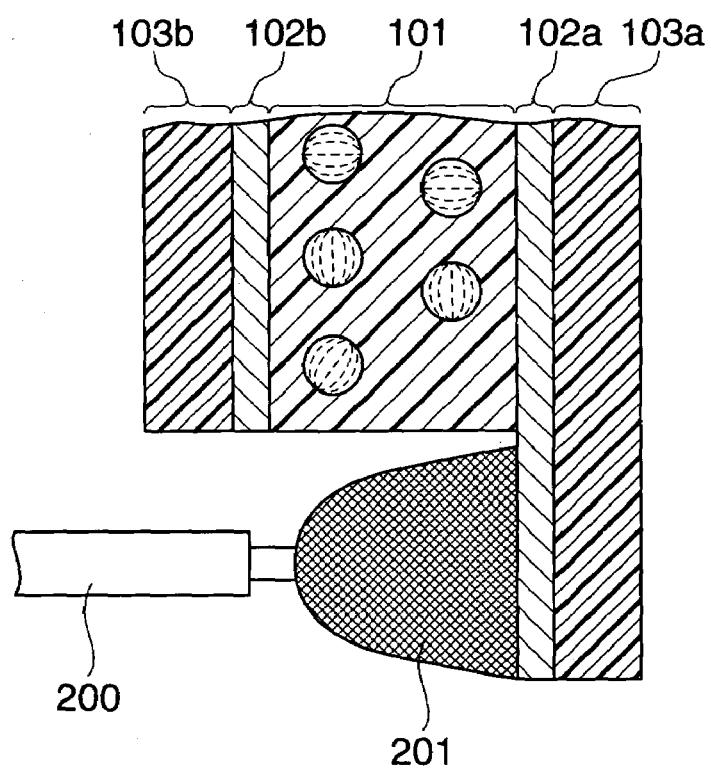
FIG. 2 is a sectional view of an area in the vicinity of an electrode terminal section 201 of a light adjusting sheet 100 appearing in FIG. 1.

At a part of the periphery of the light adjusting sheet 100, the sticking surface of the transparent electrically conductive film 102a is exposed by stripping off the liquid crystal layer 101, transparent electrically conductive film 102b, and PET film 103b, which are arranged to face the transparent electrically conductive film 102a, and an electrode terminal section 201 having a lead wire 200 is disposed on the sticking surface of the transparent electrically conductive film 102a thus exposed (FIG. 2). Similarly, another electrode terminal section is disposed on the sticking surface of the transparent electrically conductive film 102b at a part of the periphery of the light adjusting sheet 100 (not illustrated). Electric power is supplied to the lead wires of the electrode terminal sections to apply a voltage between the transparent electrically conductive films 102a and 102b.

When a voltage is not being applied between the transparent electrically conductive films 102a and 102b, the nematic liquid crystal molecules in each liquid crystal capsule 105 line up parallel with the inner walls of the liquid crystal capsules 105, and are thus not aligned in a direction perpendicular to the transparent electrically conductive films 102a and 102b, but are oriented in various directions.

Thus, due to the nematic liquid crystal molecules having a birefringence and being oriented in various directions, and the existence of interfaces of the liquid crystal capsules 105 in the polymer film 104, the light transmitted through the PET film 103 and the transparent electrically conductive films 102a and 102b is scattered, which causes cloudiness to occur in the light adjusting sheet 100.

When a voltage is being applied between the transparent electrically conductive films 102a and 102b, the nematic liquid crystal molecules in each liquid crystal capsule 105 line up parallel with the direction in which the voltage is applied. Also, in the light adjusting sheet 100, the ordinary refractive index of the nematic liquid crystal molecules is equal to the refractive index of the polymer film 104, and thus, it can be regarded that the liquid crystal capsules 105 do not have interfaces optically existing in the polymer film 104, and hence the light transmitted through the PET film 103 and the transparent electrically conductive films 102a and 102b is not scattered, whereby the light adjusting sheet 100 becomes transparent.

Next, a description will be given of a method of manufacturing the light adjuster according to the present embodiment.

FIG. 3 is a flow chart of a process for manufacturing the light adjusting sheet 100 of FIG. 1.

In FIG. 3, first, PET films 103a and 103b, on one surfaces of which the transparent electrically conductive films 102a and 102b, respectively, made of ITO are formed, are prepared (step S30).

Next, a polymer solution in the form of a paste mixed with nematic liquid crystal molecules is applied to a predetermined thickness onto the sticking surface of the transparent electrically conductive film 102a (step S31), the applied polymer solution is e.g. left for a predetermined period of time to be cured until it becomes sticky so as to form the liquid crystal layer 101 having a predetermined viscosity, described later (step S32), and the PET film 103b with the transparent electrically conductive film (102b) formed thereon is stuck onto the liquid crystal layer 101 so that the liquid crystal layer 101 which has been cured to become sticky contacts the sticking surface of the transparent electrically conductive film 102b (step S33).

Thereafter, at a part of the periphery of the light adjusting sheet 100, the liquid crystal layer 101, transparent electrically conductive film 102b, and PET film 103b, which are arranged to face the transparent electrically conductive film 102a, are stripped off to expose the sticking surface of the transparent electrically conductive film 102a, and the electrode terminal section 201 is placed on the sticking surface of the exposed transparent electrically conductive film 102a. Similarly, the sticking surface of the transparent electrically conductive film 102b is exposed, and an electrode terminal section (not illustrated) is placed on the sticking surface of the exposed transparent electrically conductive film 102b (step S34), and the present process is terminated.

The predetermined viscosity of the liquid crystal layer 101 in the step S32 is determined such that the force required for stripping the liquid crystal layer 101 off is in a range of 15 to 50 g/cm, and more preferably in a range of 20 to 30 g/cm.

According to the light adjuster of the present embodiment, the force required for stripping off is in a range of 15 to 50 g/cm, and more preferably in a range of 20 to 30 g/cm, it is possible to prevent the occurrence of cloudiness, and also, since the force required for stripping off is not greater than 65 g/cm, sufficient workability in stripping the liquid crystal layer 101 off can be maintained, and partial exfoliation of the sheet-like transparent electrically conductive films 102a and 102b can be avoided, thus preventing degradation of the yield.

Furthermore, the liquid crystal layer 101 is stuck onto the transparent electrically conductive film 102b in the state where the polymer film 104 of the liquid crystal layer 101 is sticky, and hence the force required for stripping off can be easily set to be in a predetermined range.

As stated above, the polymer film 104 according to the present embodiment is cured by being left for a predetermined period of time, but in place of the polymer film 104, ultraviolet curing resin may be used to cure the liquid crystal layer 101 by controlling the amount of ultraviolet light radiated and the period of time for which ultraviolet light is radiated, so that the viscosity of the liquid crystal layer 101 can quickly reach a predetermined value.

Moreover, in a laminated glass having a plurality of glass sheets disposed in facing relation to each other, the light adjusting sheet 100 is sandwiched between the plurality of glass sheets, so that the laminated glass can control the amount of light transmitted. The laminated glass as well can obtain the above described effects.

EXAMPLES

Next, examples according to the present invention will be described in detail.

Example 1

First, a large number of PET films having a thickness of 175 μm, on one surface of each of which an ITO film as an electrically conductive film is formed, were prepared.

Next, a polymer solution in the form of a paste with nematic liquid crystal molecules mixed therein was applied to a predetermined thickness onto the sticking surface of the ITO film of one PET film, the applied polymer solution was left for a predetermined period of time to cure the resulting liquid crystal layer until the liquid crystal layer showed such a viscosity that the force required for stripping the liquid crystal layer off was 15 g/cm, and another PET film having the ITO film was stuck onto the liquid crystal layer such that the liquid crystal layer contacted the sticking surface of the ITO film, thus obtaining a light adjusting sheet. At this time, two sets of one-hundred light adjusting sheets were prepared.

Then, rectangular samples with a size of 2.5 cm×15 cm were produced from each of the light adjusting sheets in one set to observe the occurrence of exfoliation of the ITO films when the liquid crystal layer was stripped off by a T-shape strip test adhesive strength testing method (JIS K 6854-3) using a strip tester ("EZ Test" made by Shimadzu Corporation), and on the other hand, an exposure test was conducted for 100 days on a laminated glass manufactured using the other set of light adjusting sheets to observe the occurrence of cloudiness after the exposure test. The test results are shown as yields in Table 1 given below.

Example 2

In the same procedure as in Example 1, two sets of one-hundred light adjusting sheets, in which the force required for stripping the liquid crystal layer off is 20 g/cm, were prepared.

Then, the same T-shape strip test adhesive strength test and exposure test as in Example 1 were conducted, and the test results are shown as yields in Table 1 given below.

Example 3

In the same procedure as in Example 1, two sets of one-hundred light adjusting sheets, in which the force required for stripping the liquid crystal layer off is 30 g/cm, were prepared.

Then, the same T-shape strip test adhesive strength test and exposure test as in Example 1 were conducted, and the test results are shown as yields in Table 1 given below.

Example 4

In the same procedure as in Example 1, two sets of one-hundred light adjusting sheets, in which the force required for stripping the liquid crystal layer off is 50 g/cm, were prepared.

Then, the same T-shape strip test adhesive strength test and exposure test as in Example 1 were conducted, and the test results are shown as yields in Table 1 given below.

Comparative Example 1

First, a large number of PET films having a thickness of 175 μm, on one surface of each of which an ITO film as an electrically conductive film is formed, were prepared.

Next, an ultraviolet curing resin with nematic liquid crystal molecules mixed therein was applied to a predetermined thickness onto the sticking surface of the ITO film of one PET film, ultraviolet light was radiated upon the applied ultraviolet curing resin so that the resulting liquid crystal layer could be cured to have such a viscosity that the force required for stripping the liquid crystal layer off was 8 g/cm, and another PET film having the ITO film was stuck onto the liquid crystal layer such that the liquid crystal layer contacted the sticking surface of the ITO film, thus obtaining a light adjusting sheet. At this time, two sets of one-hundred light adjusting sheets were prepared.

Then, the same T-shape strip test adhesive strength test and exposure test as in Example 1 were conducted, and the test results are shown as yields in Table 1 given below.

Comparative Example 2

In the same procedure as in Comparative Example 1, two sets of one-hundred light adjusting sheets, in which the force required for stripping the liquid crystal layer off is 10 g/cm, were prepared.

Then, the same T-shape strip test adhesive strength test and exposure test as in Example 1 were conducted, and the test results are shown as yields in Table 1 given below.

Comparative Example 3

In the same procedure as in Example 1, two sets of one-hundred light adjusting sheets, in which the force required for stripping the liquid crystal layer off is 65 g/cm, were prepared.

Then, the same T-shape strip test adhesive strength test and exposure test as in Example 1 were conducted, and the test results are shown as yields in Table 1 given below.

Comparative Example 4

In the same procedure as in Example 1, two sets of one-hundred light adjusting sheets, in which the force required for stripping the liquid crystal layer off is 80 g/cm, were prepared.

Then, the same T-shape strip test adhesive strength test and exposure test as in Example 1 were conducted, and the test results are shown as yields in Table 1 given below.

TABLE 1

|  | Stripping Force (g/cm) | Yield Depending upon Cloudiness (%) | Yield Depending upon Exfoliation of ITO Films (%) |
| --- | --- | --- | --- |
| Example 1 | 15 | 80 | 100 |
| Example 2 | 20 | 86 | 100 |
| Example 3 | 30 | 91 | 92 |
| Example 4 | 50 | 98 | 80 |
| Comparative Example 1 | 8 | 23 | 100 |
| Comparative Example 2 | 10 | 45 | 100 |
| Comparative Example 3 | 65 | 100 | 50 |
| Comparative Example 4 | 80 | 100 | 37 |

From the yields dependent upon the occurrence of cloudiness in Examples 1 to 4 and Comparative Examples 1 and 2, it was found that a yield of more than 80% can be ensured and the durability can be improved if the stripping force is not less than 15 g/cm. Further, it was found that a yield of more than 86% can be ensured and the durability can be further improved if the stripping force is not less than 20 g/cm.

According to the yields dependent upon the occurrence of exfoliation of the ITO films in Examples 1 to 4 and Comparative Examples 3 and 4, it was found that a yield of more than 80% can be ensured and the productivity can be improved if the stripping force is not greater than 50 g/cm. Further, it was found that a yield of more than 92% can be ensured and the productivity can be further improved if the stripping force is not greater than 30 g/cm.

INDUSTRIAL APPLICABILITY

As described above in detail, according to the light adjuster of the present invention, since the force required for stripping the liquid crystal layer from the transparent electrically conductive films is in a range of 15 to 50 g/cm, and more preferably in a range of 20 to 30 g/cm, it is possible to prevent occurrence of cloudiness, and also, since the force required for stripping off is not greater than 65 g/cm, it is possible to maintain sufficient workability in stripping the liquid crystal layer off, avoid partial exfoliation of the transparent electrically conductive films, and prevent degradation of the yield.

According to the light adjuster of the present invention, the transparent electrically conductive films are stuck onto the liquid crystal layer in the state in which the liquid crystal layer is sticky. As a result, the force required for stripping the liquid crystal layer from the transparent electrically conductive films can be easily set to be in a predetermined range.

According to the laminated glass of the present invention, there are provided at least two glass sheets disposed in facing relation to each other, and the light adjuster interposed between the two glass sheets, and in the light adjuster, the transparent electrically conductive films are provided on the respective facing surfaces of the pair of substrates, at least one of which is transparent, the liquid crystal layer is interposed between the transparent electrically conductive films, and the force required for stripping the liquid crystal layer from the transparent electrically conductive films is in a range of 15 to 50 g/cm. As a result, it is possible to prevent occurrence of cloudiness, maintain sufficient workability in stripping the liquid crystal layer off, avoid partial exfoliation of the transparent electrically conductive films, and prevent degradation of the yield.

The invention claimed is:

1. A light adjuster comprising:
   a pair of substrates, at least one of the substrates being transparent;
   transparent electrically conductive films provided on respective facing surfaces of the pair of substrates; and
   a liquid crystal layer interposed between the transparent electrically conductive films in attachment thereto, wherein said liquid crystal layer has a viscosity selected such that a force required for stripping said liquid crystal layer from said transparent electrically conductive films is in a range of 15 to 50 g/cm.

2. A light adjuster according to claim 1, wherein the force required for stripping is in a range of 20 to 30 g/cm.

3. A light adjuster according to claim 1, wherein the liquid crystal layer is stuck onto the transparent electrically conductive films in a state where the liquid crystal layer is sticky.

4. A light adjuster according to claim 1, wherein said liquid crystal layer is formed by applying a paste with nematic liquid crystal molecules mixed therein to said transparent electrically conductive film and curing the applied paste so as to attain said selected viscosity.

5. A light adjuster according to claim 4, wherein the applied paste is left for a predetermined period of time in curing the applied paste.

6. A light adjuster according to claim 4, wherein an amount of ultraviolet light radiated toward the applied paste and a period of time for which the ultraviolet light is radiated are controlled in curing the applied paste.

7. A laminated glass comprising:
   at least two glass sheets disposed in facing relation to each other; and
   a light adjuster interposed between the two glass sheets, wherein said light adjuster comprises a pair of substrates, at least one of said substrates being transparent, transparent electrically conductive films provided on respective facing surfaces of said pair of substrates and a liquid crystal layer interposed between said transparent electrically conductive films in attachment thereto, wherein said liquid crystal layer has a viscosity selected such that a force required for stripping said liquid crystal layer from said transparent electrically conductive films is in a range of 15 to 50 g/cm.

8. A laminated glass according to claim 7, wherein the force required for stripping is in a range of 20 to 30 g/cm.

9. A laminated glass according to claim 7, wherein the liquid crystal layer is stuck onto the transparent electrically conductive films in a state where the liquid crystal layer is sticky.

10. A laminated glass according to claim 7, wherein said liquid crystal layer is formed by applying a paste with nematic liquid crystal molecules mixed therein to said transparent electrically conductive film and curing the applied paste so as to attain said selected viscosity.

11. A laminated glass according to claim 10, wherein the applied paste is left for a predetermined period of time in curing the applied paste.

12. A laminated glass according to claim 10, wherein an amount of ultraviolet light radiated toward the applied paste and a period of time for which the ultraviolet light is radiated are controlled in curing the applied paste.

* * * * *